United States Patent [19]
Sato et al.

[11] Patent Number: 5,736,931
[45] Date of Patent: Apr. 7, 1998

[54] REMOTE CONTROL SYSTEM FOR ELECTRONIC DEVICES

[75] Inventors: Hitoshi Sato; Masashi Iwasaki; Tadamasa Yamanaka; Kazuyoshi Kamiyama; Nobuhiro Ozu, all of Saitama-ken, Japan

[73] Assignee: Pioneer Electronic Corporation, Tokyo, Japan

[21] Appl. No.: 451,769

[22] Filed: May 26, 1995

[30] Foreign Application Priority Data

Jun. 22, 1994 [JP] Japan .................................. 6-140152

[51] Int. Cl.⁶ .................... H04Q 19/02; H04B 10/00; H04N 5/44; G05B 23/02
[52] U.S. Cl. .................. 340/825.25; 359/142; 348/734; 340/825.07
[58] Field of Search .................. 340/825.25, 825.07, 340/825.52, 825.24, 825.69, 825.72; 359/142, 145, 148; 348/734

[56] References Cited

U.S. PATENT DOCUMENTS

| | | | |
|---|---|---|---|
| 4,855,730 | 8/1989 | Venners et al. | 340/825.24 |
| 5,237,322 | 8/1993 | Heberle | 340/870.13 |
| 5,305,355 | 4/1994 | Go et al. | 375/107 |
| 5,351,041 | 9/1994 | Ikata et al. | 340/825.24 |
| 5,446,551 | 8/1995 | Kawaguchi et al. | 358/335 |
| 5,457,446 | 10/1995 | Yamamoto | 340/825.24 |
| 5,488,357 | 1/1996 | Sato et al. | 340/825.25 |

*Primary Examiner*—Michael Horabik
*Assistant Examiner*—Anthony A. Asongwed
*Attorney, Agent, or Firm*—Morgan, Lewis & Bockius LLP

[57] ABSTRACT

A remote control system is provided for remotely controlling at least two electronic devices one of which is a master device and the other is a slave device. Each device has a remote control sensor and both devices are connected with each other by a bus. The master device producers a command signal for commanding the slave device to send a connection confirmation signal representing that the slave device is connected to the bus. The slave device sends a connection information signal representing that the slave device is connected to the bus and is remotely controllable in response to the command signal. The master device makes a remote control signal received by the own remote control sensor ineffective when receiving the connection information signal.

9 Claims, 10 Drawing Sheets

| FORMAT | TP | DATA | | | | | | | CHECK SUM |
|---|---|---|---|---|---|---|---|---|---|
| CONNECTION FORMAT | 00 | PS | LA | LA | LA | | | | CS |
| | 00 | PS | LA | LA | PA | PS | LA | LA | CS |
| DISPLAY FORMAT | 10 | PS | TL | LN | LS | LS | LM | | CS |
| | 20 | | | | | | | | CS |
| | 30 | | | | | | | KEY | CS |
| | 40 | | | | | | | COMMAND | CS |
| | 50 | | | | | | | COMMAND | CS |
| | 60 | | | | | | | COMMAND | CS |
| | 70 | | | | | | | DISPLAY | |
| | 80 | | | | | | | COMMAND | |
| | 90 | | | | | | | MEMORY DATA / SEQUENTIAL DATA | |
| CHECK SUM FORMAT | A0 | | | | | | | | CS |

REMOTE CONTROL SYSTEM FOR ELECTRONIC DEVICES

BACKGROUND OF THE INVENTION

The present invention relates to a system for remotely controlling a plurality of electronic devices each of which has a remote control sensor, and more particularly relates to a remote control system which causes remote control signal received by remote control sensors, other than a predetermined remote control sensor, to be inoperative.

There is a case that a new audio device such as a CD player is added to an old audio device such as an audio amplifier. If each of both the devices has a remote control sensor, malfunction may occur in the system. More particularly, if a plurality of sensors receive a remote control signal, there may occur that the remote control signal can not be interpreted as a command because of transmission defray from the sensors, timing difference, or mutual interference.

Figure 10:
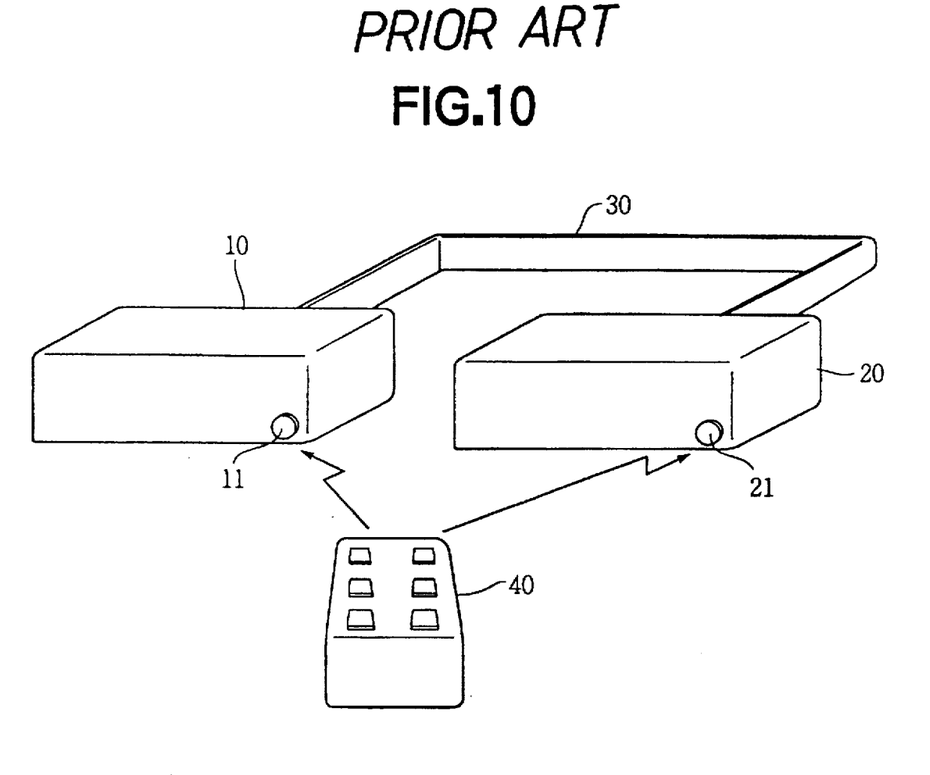
FIG. 10 is a perspective view showing conventional remote control system.

FIG. 10 shows a conventional remote control system for operating two sets of electronic devices 10 and 20 by a remote controller 40. A remote control sensor 11 of an electronic device 10 is covered by a seal (not shown) so as to prevent a light beam from entering the remote control sensor 11. Both devices 10 and 20 are connected by a bus 30 in order to transmit a remote control signal received by a remote control sensor 21 of the device 20 to the device 10, for operating it.

However, the remote control signal may enter the remote control sensor 11, if the sensor is not completely covered by the seal, causing the malfunction of the electronic device 10.

As a method for preventing the malfunction, a switch for rendering the sensor 11 inoperative is provided. However, the manual operation of the switch makes trouble for the user.

SUMMARY OF THE INVENTION

An object of the present invention is to provide a remote control system which may reliably prevent two or more electronic device from receiving a remote control signal at the same time without manually manipulating a switch.

According to the present invention, there is provided a remote control system for at least two electronic devices one of which is a master device and the other is a slave device, each device having a remote control sensor and both devices being connected with each other by a bus.

The system comprises command means provided on the master device producing a command signal at starting of operation for commanding the slave device to send a connection confirmation signal representing that the slave device is connected to the bus, response means provided on the slave device for sending a connection information signal representing that the slave device is connected to the bus and is remotely controllable in response to the command signal, and means provided on the master device for making a remote control signal received by its own remote control sensor ineffective when receiving the connection information signal.

The system further comprises control means provided on the slave device for performing a command of a remote control signal received by its own remote control sensor and for sending a command (to which the slave device can not reply) to the master device.

The other objects and features of this invention will become understood from the following description with reference to the accompanying drawings.

DETAILED DESCRIPTION OF THE PREFERRED EMBODIMENTS

Figure 1:
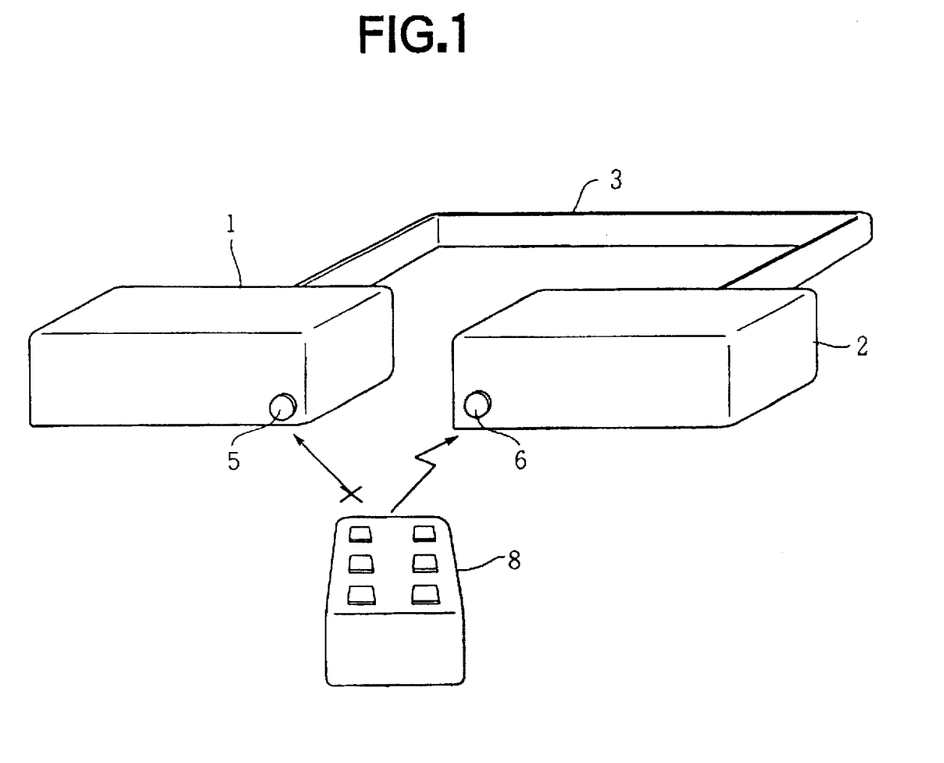
FIG. 1 is a perspective view showing a remote control system for operating two sets of electronic devices according to the present invention.

FIG. 1 shows a system according to the present invention. An electronic device (master) 1 and an electronic device (slave) 2 are connected with each other by a bus 3. The system is so arranged that the electronic device 1 operates to render a remote control signal from a remote controller 8 and received by its own remote control sensor 5 ineffective. Accordingly, only a remote control signal received by a remote control sensor 6 of the electronic device 2 is effective.

Figure 2:
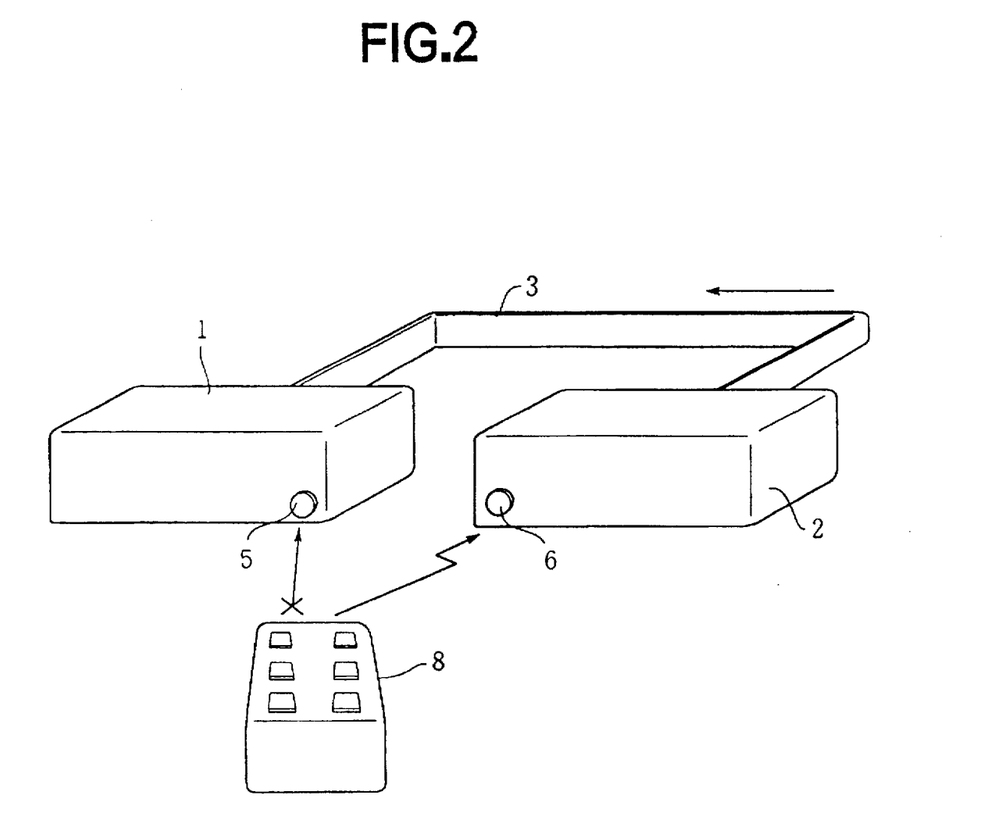
FIG. 2 is a perspective view explanatorily showing one of the operating conditions of the system.

FIG. 2 shows a condition where the electronic device 2 can not operate in response to a received remote control signal fed from the remote controller 8. In such a case, the received remote control signal is fed to the device 1 through the bus 3 so as to operate the device 1. Thus, operations of both devices 1 and 2 are controlled by the remote control signal from the remote controller 8.

Figure 3:
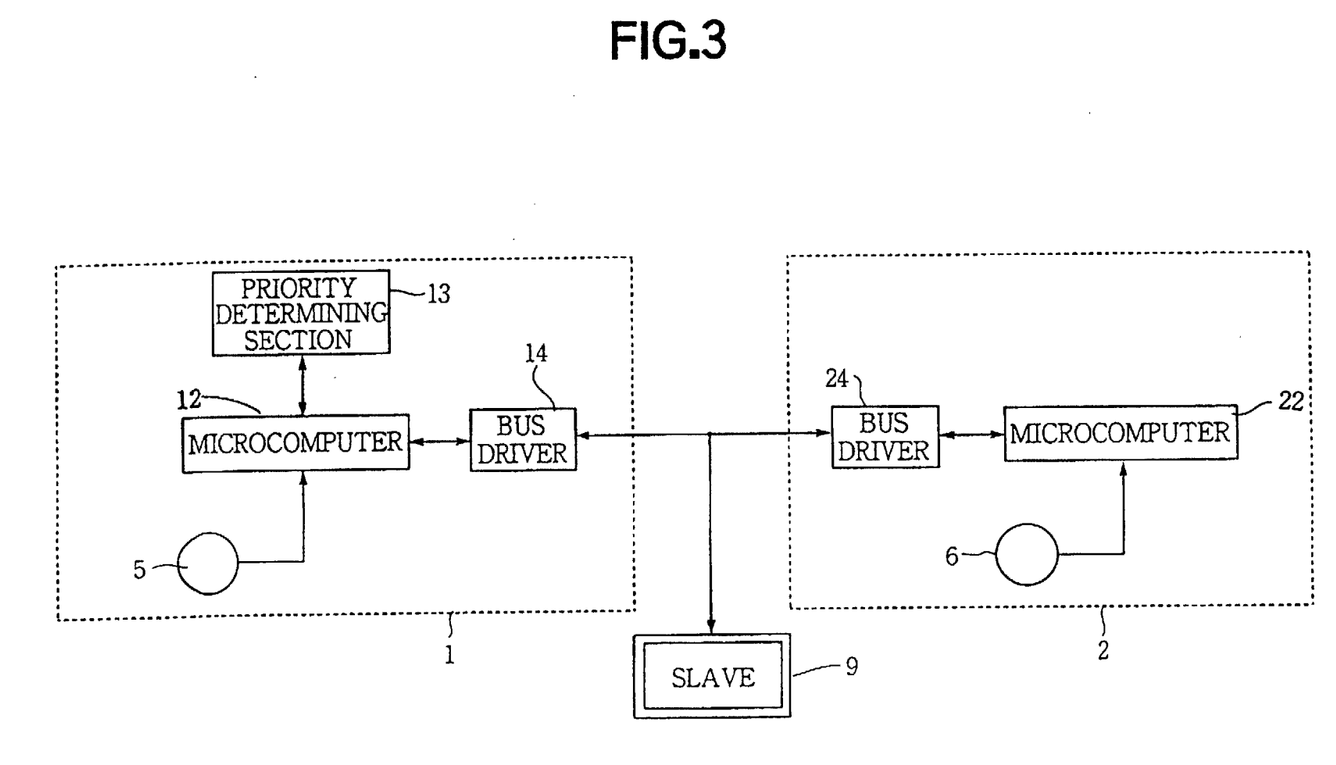
FIG. 3 is a block diagram showing control systems in the electronic devices.

FIG. 3 shows control systems provided in both devices 1 and 2. In the system of the figure, another slave device 9 is connected to the bus 3. The electronic device 1 has a microcomputer 12 for rendering a remote control signal received by the remote control sensor 5 ineffective.

Furthermore, the microcomputer 12 receives connection information signals from the devices 2 and 9 through the bus 3 and a bus driver 14. The connection information signals inform whether the devices 2 and 9 are connected to the bus 3 and include flags representing whether the devices 2 and 9 are remotely controllable devices.

In addition, the microcomputer 12 determines whether a received signal is a remote control signal fed from the remote controller 8 or an operation signal fed from its own operation keys or from operation keys of the devices 2 and 9.

A priority determining section 13 is provided for determining whether the device 2 or 9 should be given a priority and become a designated device in accordance with the connection information signal, so that a remote control sensor of the designated device becomes effective. Thus, a remote control signal received by remote control sensors of other devices except the designated device, is rendered ineffective.

The electronic device 2 also has a microcomputer 22, and a bus driver 24. The microcomputer 22 acts as control means for performing a command of a remote control signal received by the remote control sensor 6 and for sending a command to the master device if the device 2 can not reply to the received remote control signal.

Figure 4:
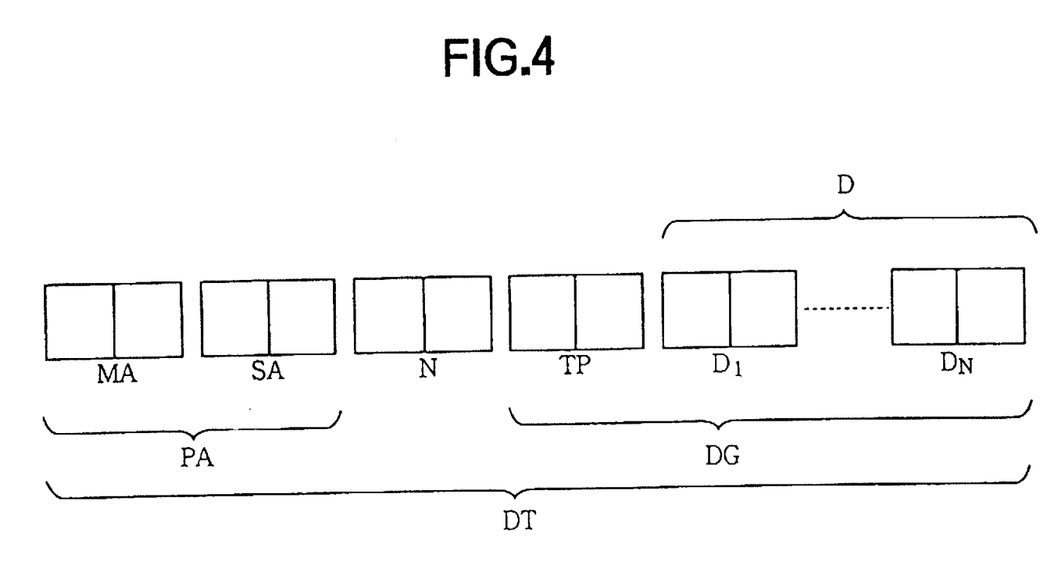
FIG. 4 is a diagram showing a transmission format for communication data fed between the devices.

FIG. 4 shows a transmission format for communication data DT fed between devices 1, 2 and 9. The communication data comprises a master address data MA representing the address of the device 1, slave address data SA of the devices 2 and 9, data D(D1-DN) representing contents of the transmitted data, sentence length data N of the transmitted sentence, classification data TP representing the kind of the data D. The address data MA and SA are a physical address PA.

Figure 5:
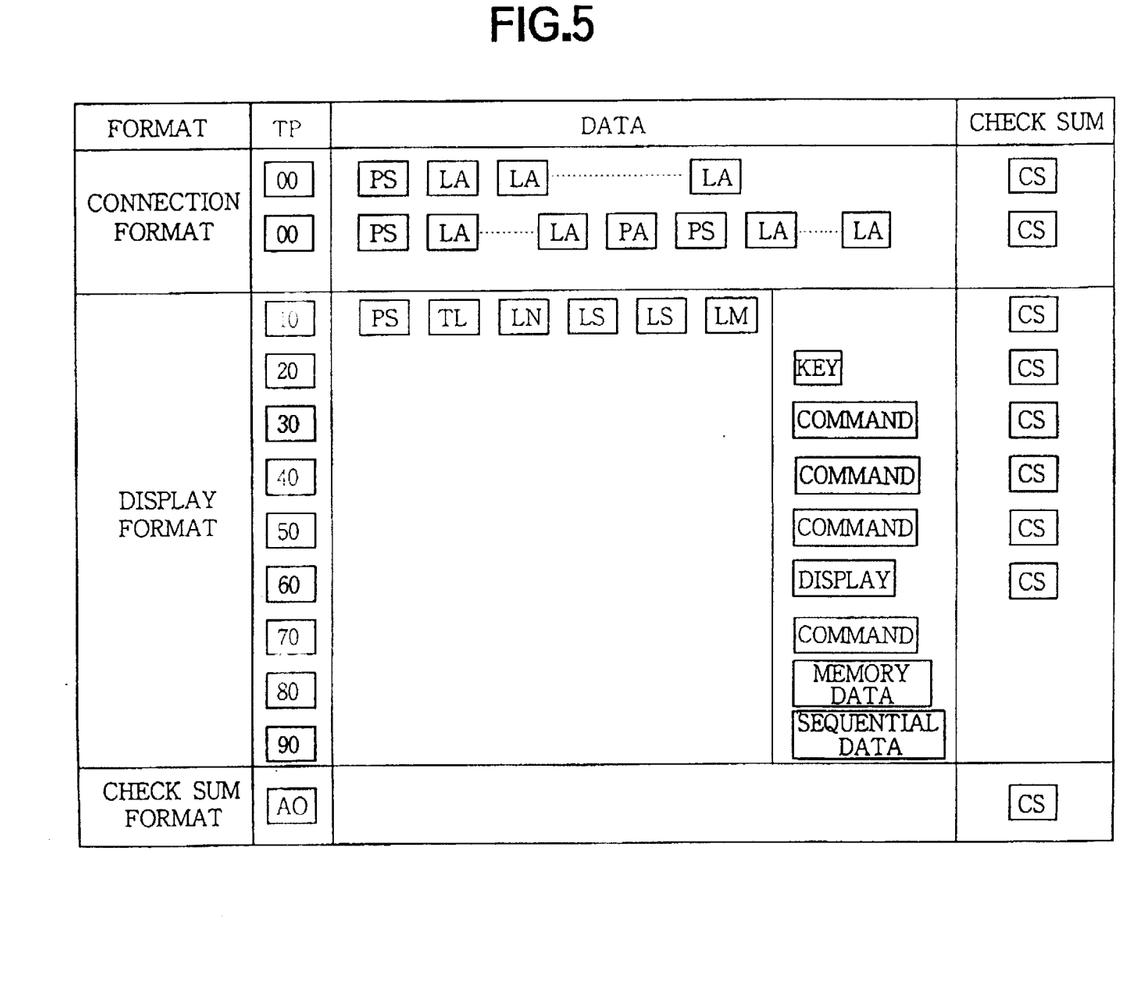
FIG. 5 is a diagram showing a composition of the data.

FIG. 5 shows the composition of the data D. The data comprises a format for confirming a connection between devices, a format for keys and display data, a format for sending a result of a check sum.

In the table, PS is a physical status, LS: logical status, LA: logical address, LM: logical mode, TL: talker address, and LN: listener address.

The physical statuses PS are status data relating to the devices 1, 2 and 9. The logical address LA represents the function of each of devices 1, 2 and 9. The logical mode LM represents the operating mode of each logical address. The talker address TL shows the address of the communication data sending device, and the listener address shows the address of the communication data receiving device.

Figure 6:
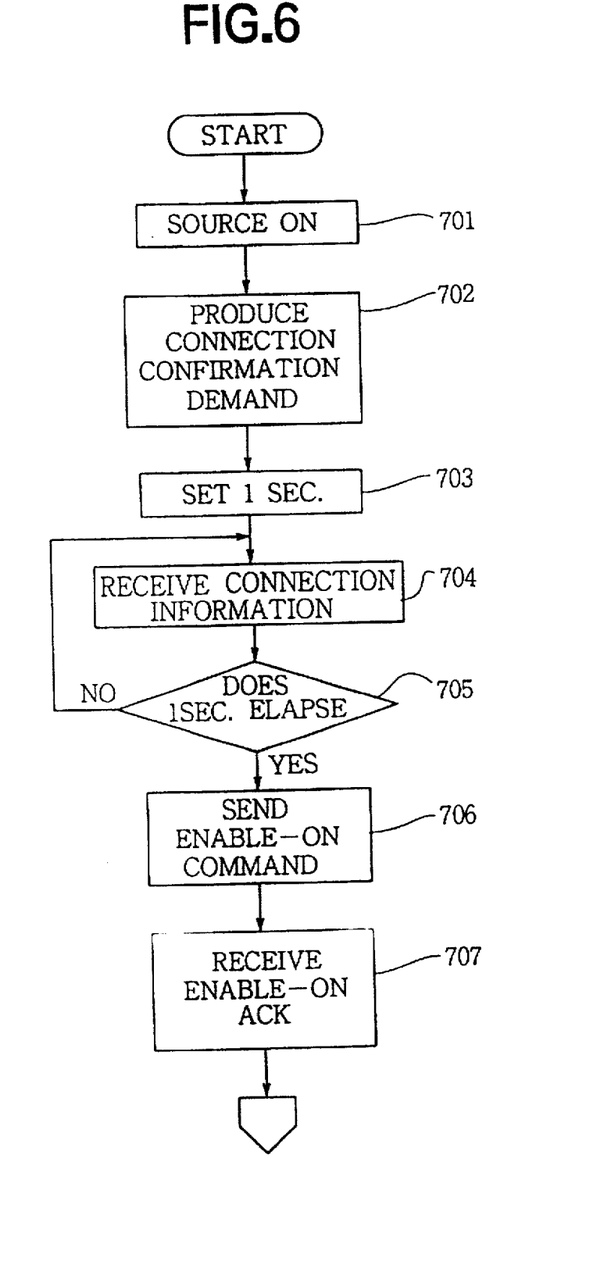
FIG. 6 is a flowchart showing an operation of the system.

The operation of the system will be described with reference to FIG. 6.

When the source is turned on, a connection confirmation demand signal is sent to devices (slaves) 2 and 9 from the device (master) 1 and a timer provided in the microcomputer 12 is set to one second (steps 701 to 703). The microcomputer 12 receives connection information signals from the devices 2 and 9 (step 704). When one second elapses (step 705), the microcomputer 12 determines the number of the devices connected to the bus 3 and whether the devices are remotely controllable devices in accordance with the flags in the connection information signals.

The priority determining section 13 determines the priority of the devices in accordance with the connection information signal received by the microcomputer 12, thereby determining a designated device so that a remote control signal applied to which is effective. An enable-on command is fed to the designated devices 2 and 9 from the microcomputer (step 706). In accordance with the command, the designated devices send enable-on acknowledgements to the microcomputer 12 (step 707). The above described data, such as the number of the devices, are stored in a memory in the microcomputer.

Figure 7:
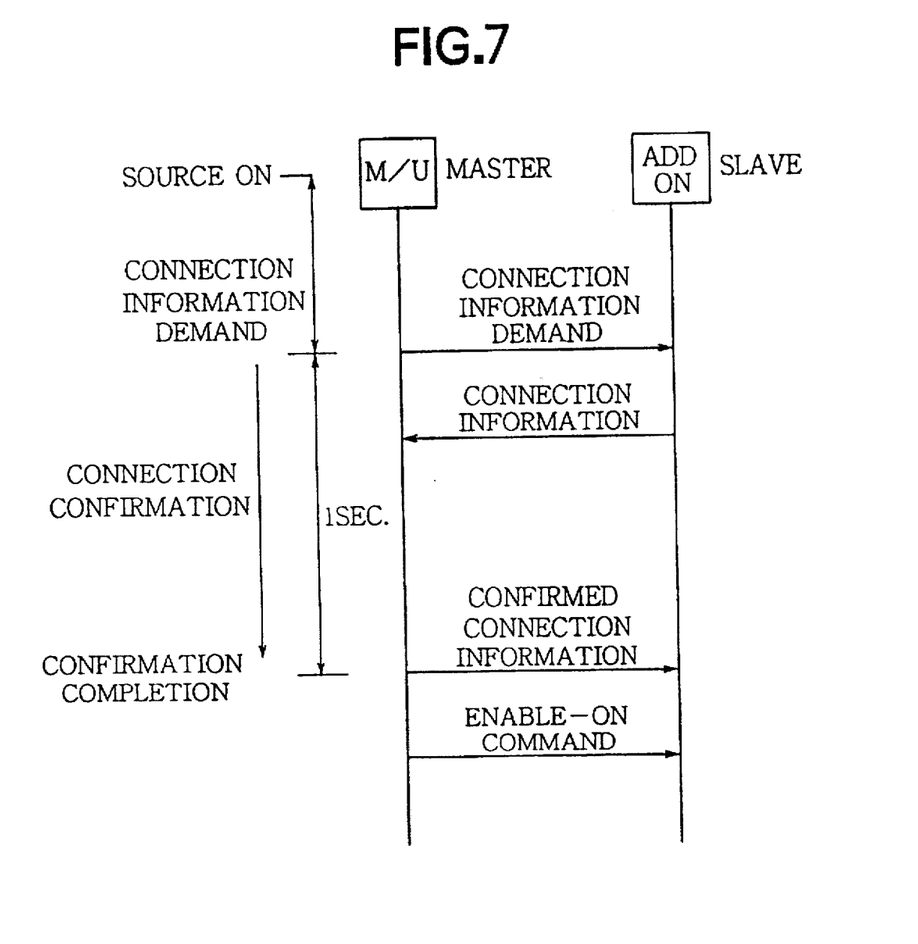
FIG. 7 is a time chart showing the operation of the system.

FIG. 7 is a time chart showing the above described operation.

Figure 8:
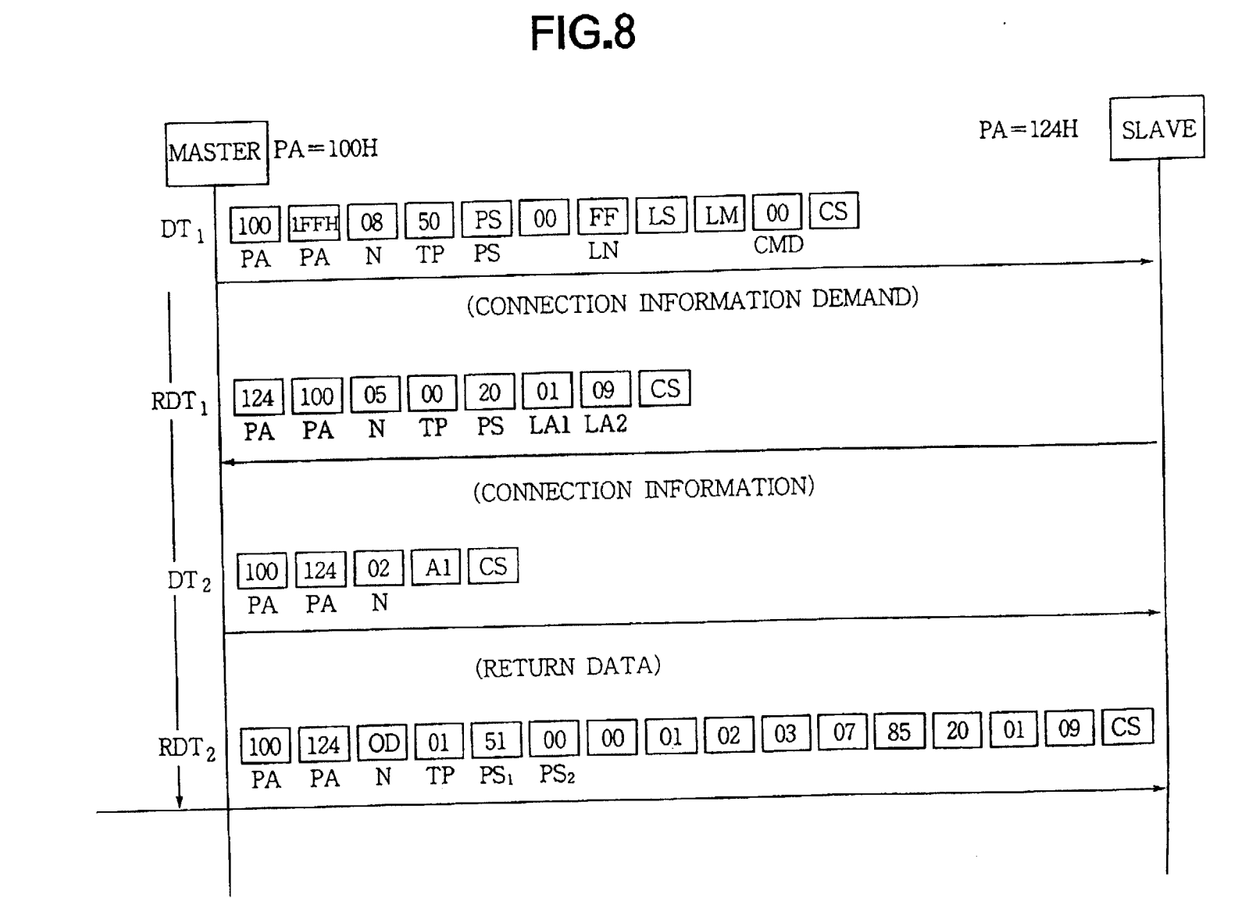
FIG. 8 is a diagram explanatorily showing the operation of the system.

FIG. 8 is an illustration for explaining the operation.

Figure 9:
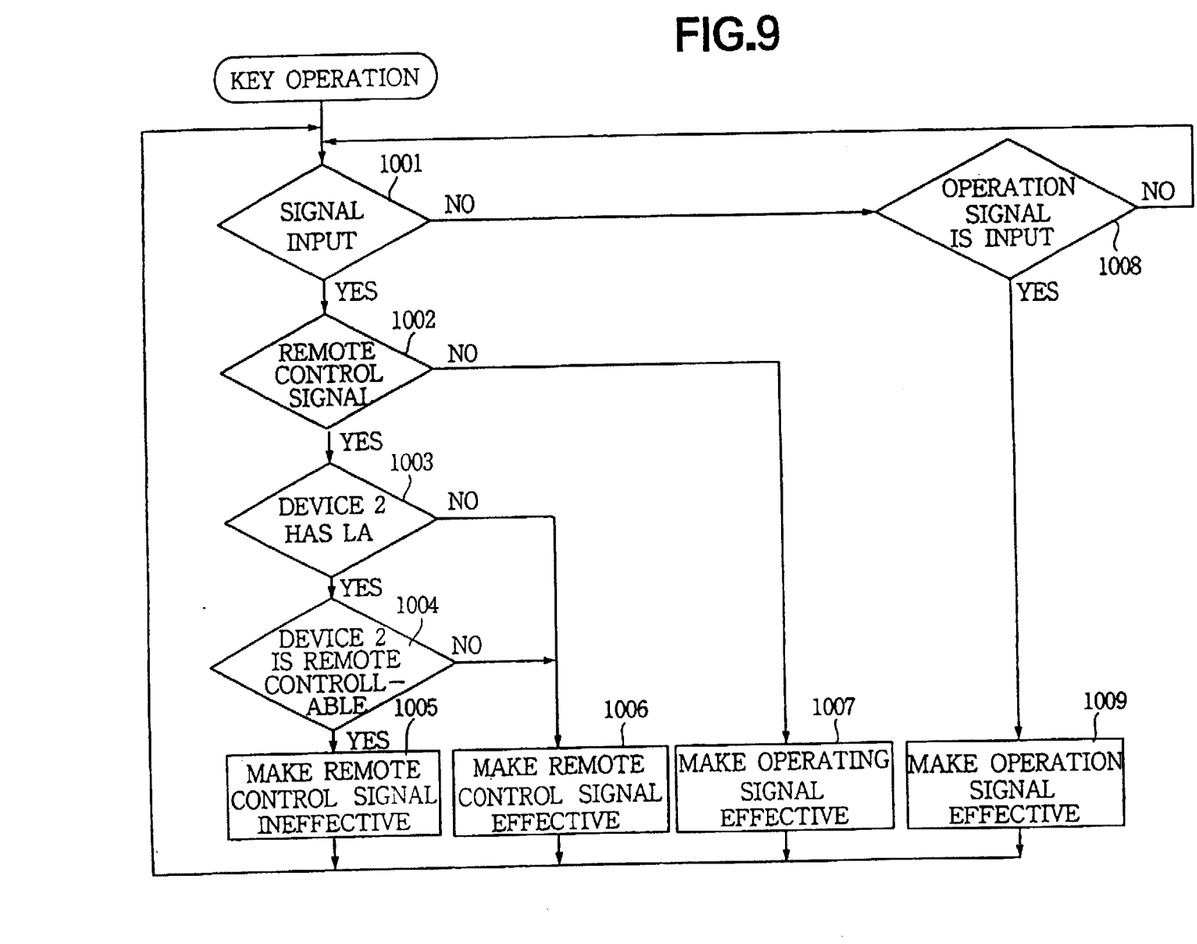
FIG. 9 is a flowchart showing an operation of the system where one of a remote control signal and operation signal is rendered effective.

FIG. 9 shows a flowchart for rendering either of a remote control signal and operation signal effective.

When the device (master) 1 receives a signal (step 1001), the microcomputer 12 determines whether the signal is a remote control signal from the remote controller 8 or an operation signal from operation keys of device 1 (step 1002). When the signal is a remote control signal from the remote controller, it is determined whether a logical address LA (function) of the device 2 is provided or not (step 1003). If it is the case, it is determined whether the device 2 is remotely controllable (step 1004). If the device 2 is remotely controllable, the remote control signal applied to the master device 1 is made ineffective (step 1005).

If the device 2 does not have a logical address LA at step 1003, or the device 2 is not remotely controllable at step 1004, the remote control signal applied to the device 1 is made effective (step 1006). When the signal is not one fed from the remote controller at the step 1002, an operation signal applied from its own operation keys is made effective (step 1007).

When the master device 1 does not receive a remote control signal and an operation signal at the step 1001, it is determined that an operation signal is fed from operation keys of the device 2 (step 1008). If yes, the operation signal from the device is made effective (step 1009).

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. A remote control system for at least two electronic devices including a master device and a slave device, each device having a remote control sensor and both devices being connected with each other by a bus, the system comprising:

command means provided on the master device for commanding the slave device to send a connection confirmation signal representing a fact that the slave device has been connected to the master device;

response means provided on the slave device for sending the connection confirmation signal to the master device representing that the slave device is connected to the master device and is remotely controllable;

means provided on the master device for making a first remote control signal received by remote control sensor of the master device ineffective when receiving the connection confirmation signal; and control means provide on the slave device for performing a first command of a second remote control signal received by the remote control sensor of the slave device and for sending a second command to the master device if the slave device cannot operate in accordance with the second remote control signal.

2. A remote control system for controlling one master device and at least one slave device, the master and the slave device being connected by a bus, the system comprising:

a first controller provided in the raster device for sending a command signal requesting a connection confirmation signal from the at least one slave device;

a response unit provided in the at least one slave device for sending the connection confirmation signal to the master device, the connection confirmation signal representing that the at least one slave device is connected to the bus and is remotely controllable; and a second controller provided in the at least one slave device for controlling a remote control signal received by a remote control sensor of the at least one slave device, and for sending the remote control signal to the master device if the at least one slave device cannot operate in accordance with the remote control signal, and wherein the first controller of the master device renders a remote control sensor of the master device ineffective when the master device receives the connection confirmation signal from the at least one slave device.

3. The remote control system as claimed in claim 2, further comprising a priority determining section for determining one of the slave devices to be a designated device, with only a remote control signal received by a remote control sensor of the designated device being effective.

4. A remote control system comprising:
   one master device and at least one slave device, the master device and each slave device having a remote control sensor, the master device and the slave devices being connected by a bus;
   a first controller provided in the master device for requesting a connection signal from each of the slave devices, the first controller rendering a remote control signal receive by the remote control sensor of the master device ineffective after receiving the connection signal from each of the slave devices; and
   a response unit provided in each of the slave devices for sending the connection signal to the master device.

5. The remote control system as claimed in claim 4, further comprising a priority determining section for determining one of the slave devices to be a designated device, with only a remote control signal received by the remote control sensor of the designated device being effective.

6. The remote control system as claimed in claim 5, further comprising a second controller provided on the designated device for controlling a remote control signal received by the remote control sensor of the designated device, and for sending the received remote control signal to the master device if the designated device cannot operate in accordance with the received remote control signal.

7. A method for remotely controlling a plurality of electronic devices including one master device and at least one slave device, comprising the steps of:
   sending a command signal from the master device to the at least one slave device requesting a connection confirmation signal;
   responding to the command signal by sending the connection confirmation signal from the at least one slave device to the master device;
   after receiving the connection confirmation signal from the at least one slave device, rendering a remote control signal received by the remote control sensor of the master device ineffective.

8. The method as claimed in claim 7, further comprising the step of sending the remote control signal received by a remote control sensor of the at least one slave device to the master device if the at least one slave device cannot operate in accordance with the remote control signal.

9. The method as claimed in claim 7, further comprising a step of determining one of the slave devices to be a designated device, with only a remote control signal received by a remote control sensor of the designated device being effective.

* * * * *

UNITED STATES PATENT AND TRADEMARK OFFICE
CERTIFICATE OF CORRECTION

PATENT NO. : 5,736,931
DATED : April 7, 1998
INVENTOR(S) : Sato et al.

It is certified that error appears in the above-identified patent and that said Letters Patent is hereby corrected as shown below:

On the title page:
In Item [57] ABSTRACT:

Line 5, change "producers" to --produces--.

Column 4, Line 34, after "by" insert --the--;

Line 37, change "provide" to --provided--;

Line 47, change "raster" to --master--.

Column 5, Line 12, change "receive" to --received--.

Signed and Sealed this

Twelfth Day of January, 1999

Attest:

*Attesting Officer*     *Acting Commissioner of Patents and Trademarks*